(12) United States Patent
Shiraishi et al.

(10) Patent No.: US 7,456,870 B2
(45) Date of Patent: Nov. 25, 2008

(54) IMAGE SENSING APPARATUS, IMAGE SENSING METHOD, PROGRAM FOR REALIZING THE IMAGE SENSING METHOD, AND STORAGE MEDIUM WHICH STORES THE PROGRAM

(75) Inventors: Akihiko Shiraishi, Tokyo (JP); Kota Terayama, Kanagawa (JP); Yasuyoshi Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 865 days.

(21) Appl. No.: 10/681,694

(22) Filed: Oct. 7, 2003

(65) Prior Publication Data
US 2004/0080663 A1    Apr. 29, 2004

(30) Foreign Application Priority Data

Oct. 9, 2002    (JP)    ............................. 2002-296123
Dec. 25, 2002    (JP)    ............................. 2002-374525

(51) Int. Cl.
*H04N 5/76*    (2006.01)
*H04N 5/238*    (2006.01)

(52) U.S. Cl. .................................... 348/231.3; 348/364

(58) Field of Classification Search .............. 348/231.3, 348/362, 364, 349, 366
See application file for complete search history.

(56) References Cited

U.S. PATENT DOCUMENTS

| | | | | |
|---|---|---|---|---|
| 5,227,835 A | * | 7/1993 | Anagnostopoulos | ......... 396/49 |
| 5,359,385 A | * | 10/1994 | Ishida et al. | ................... 396/49 |
| 5,400,110 A | | 3/1995 | Soshi | ......................... 354/402 |
| 5,937,216 A | * | 8/1999 | Homma et al. | ................. 396/95 |
| 6,900,840 B1 | * | 5/2005 | Schinner et al. | ........ 348/333.01 |
| 6,914,624 B1 | * | 7/2005 | Esquibel et al. | ........ 348/207.99 |
| 6,963,360 B1 | * | 11/2005 | Esquibel et al. | ........ 348/207.99 |
| 6,977,679 B2 | * | 12/2005 | Tretter et al. | ............. 348/231.2 |
| 7,009,641 B2 | * | 3/2006 | Takahashi | ................. 348/223.1 |
| 7,019,919 B2 | * | 3/2006 | Wakai et al. | ................. 359/726 |
| 7,164,446 B2 | * | 1/2007 | Konishi | ...................... 348/349 |
| 2001/0019364 A1 | * | 9/2001 | Kawahara | ................... 348/362 |
| 2002/0085100 A1 | | 7/2002 | Takahashi | ................... 348/223 |

OTHER PUBLICATIONS

Mar. 9, 2007 Office Action of corresponding Chinese patent application.

\* cited by examiner

*Primary Examiner*—Justin P Misleh
(74) *Attorney, Agent, or Firm*—Morgan & Finnegan LLP

(57) ABSTRACT

An object of this invention is to eliminate cumbersomeness and improve the photographer's convenience by inputting settings to an image sensing apparatus by the user. To achieve this object, an image sensing apparatus includes a memory which stores information on a photographing frequency in association with object distance information and brightness information, an acquisition device which acquires an object brightness value on the basis of image information sensed by an image sensing device, and a control device which refers to the memory to detect an object distance having the highest photographing frequency among object distances corresponding to the acquired object brightness value, and controls image sensing operation on the basis of the detected object distance information.

15 Claims, 16 Drawing Sheets

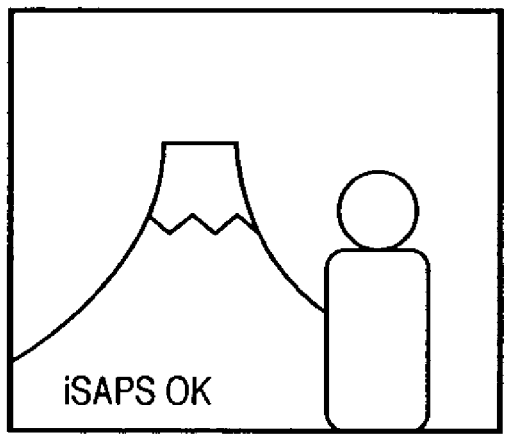
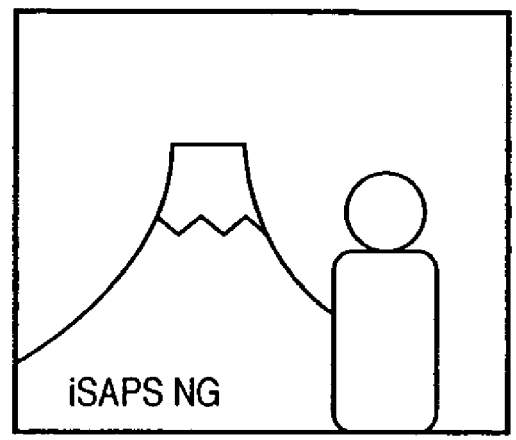
F I G. 15A  F I G. 15B

IMAGE SENSING APPARATUS, IMAGE SENSING METHOD, PROGRAM FOR REALIZING THE IMAGE SENSING METHOD, AND STORAGE MEDIUM WHICH STORES THE PROGRAM

FIELD OF THE INVENTION

The present invention relates to an image sensing apparatus such as a digital camera which senses an object.

BACKGROUND OF THE INVENTION

Conventional image sensing apparatuses require various condition settings in accordance with a scene to be photographed, and are cumbersome to a user who is not accustomed to dealing with such complicated apparatus. Corresponding image processing has settings determined by the manufacturer, which do not always satisfy the photographer's demand.

SUMMARY OF THE INVENTION

It is an object of the present invention to eliminate cumbersomeness and improve the photographer's convenience by inputting settings to an image sensing apparatus by the user.

More specifically, an in-focus position is conventionally determined within an object distance range of 0 to ∞, requiring a long determination time. This in-focus position determination time is shortened. When the flash emits light in order to illuminate an object, a test emission amount for determining an emission amount in actual photographing is determined to a proper value. A white detection range for detecting white image data used in white balance processing is set to a proper range.

To achieve the above object, according to the first aspect of the present invention, an image sensing apparatus is comprising a memory which stores information on a photographing frequency in association with object distance information and brightness information, an acquisition device which acquires an object brightness value on the basis of image information sensed by an image sensing device, and a control device which refers to the memory to detect an object distance having the highest photographing frequency among object distances corresponding to the acquired object brightness value, and controls image sensing operation on the basis of the detected object distance information.

According to the second aspect of the present invention, an image sensing method is comprising acquiring an object brightness value on the basis of image information sensed by an image sensing device, referring to a memory which stores information on a photographing frequency in association with object distance information and brightness information, thereby detecting an object distance having the highest photographing frequency among object distances corresponding to the acquired object brightness value, and controlling image sensing operation on the basis of the detected object distance information.

According to the third aspect of the present invention, an image sensing apparatus is comprising a memory which stores information on a photographing frequency in association with object distance information and brightness information, an acquisition device which acquires an object brightness value on the basis of image information sensed by an image sensing device, and a control device which refers to the memory to control image sensing operation on the basis of object distance information having a high photographing frequency among object distances corresponding to the acquired object brightness value.

According to the fourth aspect of the present invention, an image sensing method is comprising acquiring an object brightness value on the basis of image information sensed by an image sensing device, and referring to a memory which stores information on a photographing frequency in association with object distance information and brightness information, thereby controlling image sensing operation on the basis of object distance information having a high photographing frequency among object distances corresponding to the acquired object brightness value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 15A and 15B are views showing examples of an image display in rec view processing according to the third embodiment.

DETAILED DESCRIPTION OF THE PREFERRED EMBODIMENTS

Preferred embodiments of the present invention will be described below with reference to the accompanying drawings.

First Embodiment

Figure 1:
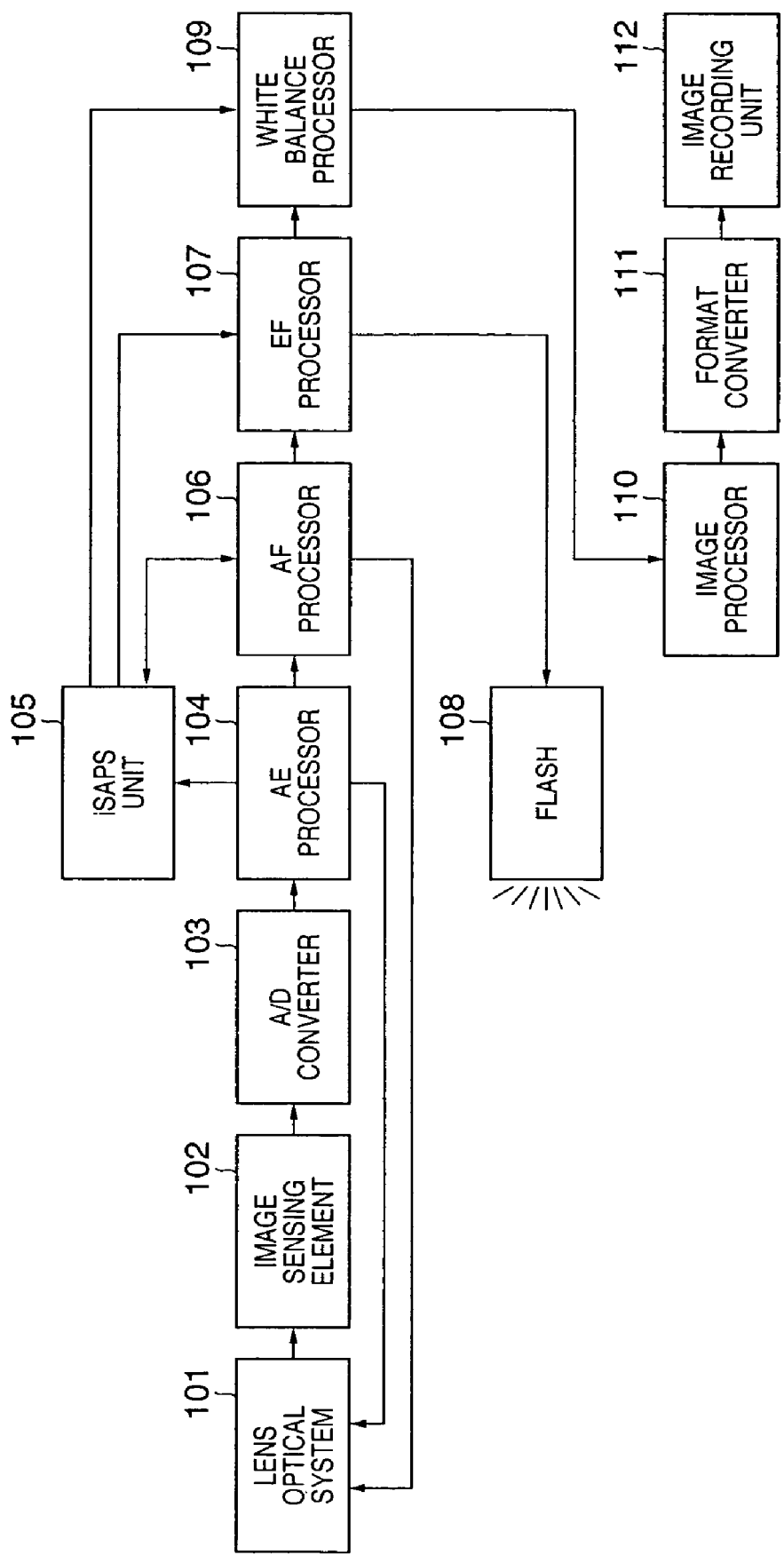
FIG. 1 is a block diagram showing an image sensing apparatus according to the first embodiment.

FIG. 1 is a block diagram schematically showing an image sensing apparatus according to the first embodiment.

A lens optical system 101 comprises a lens optical system including a lens for adjusting the focus, a stop, and a mechanical shutter. A CCD 102 is an image sensing element, and forms on its image sensing plane an object image incident via the lens optical system. An A/D converter 103 converts an analog image signal photoelectrically converted by the CCD 102 into a digital image signal.

An AE processor 104 obtains an object brightness value on the basis of the input digital image signal. The AE processor 104 controls the stop and shutter of the lens optical system 101 on the basis of the brightness value.

An iSAPS (intelligent Scene Analysis based Photographic Space) unit 105 sets a focus lens scanning range for determining an in-focus position for an AF processor 106 on the basis of the object brightness value obtained by the AE processor 104 (to be described later). The iSAPS unit 105 sets the test emission amount of a flash for illuminating an object for an EF (Electric Flash) processor 107 on the basis of the object brightness value obtained by the AE processor 104. The iSAPS unit 105 sets a white detection range for detecting, from digital image data, white image data for calculating a white balance control signal for a white balance processor 109 on the basis of the object brightness value obtained by the AE processor 104.

An image processor 110 performs γ conversion for an image signal, and a format converter 111 compresses the image signal by JPEG or the like to convert its format. An image recording unit 112 writes the image signal in the internal memory of the image sensing apparatus or a detachable external memory such as a compact flash®. Each building component of the image sensing apparatus is controlled by a CPU (not shown).

A method of setting the focus lens scanning range will be described as a feature of the first embodiment.

Figure 2:
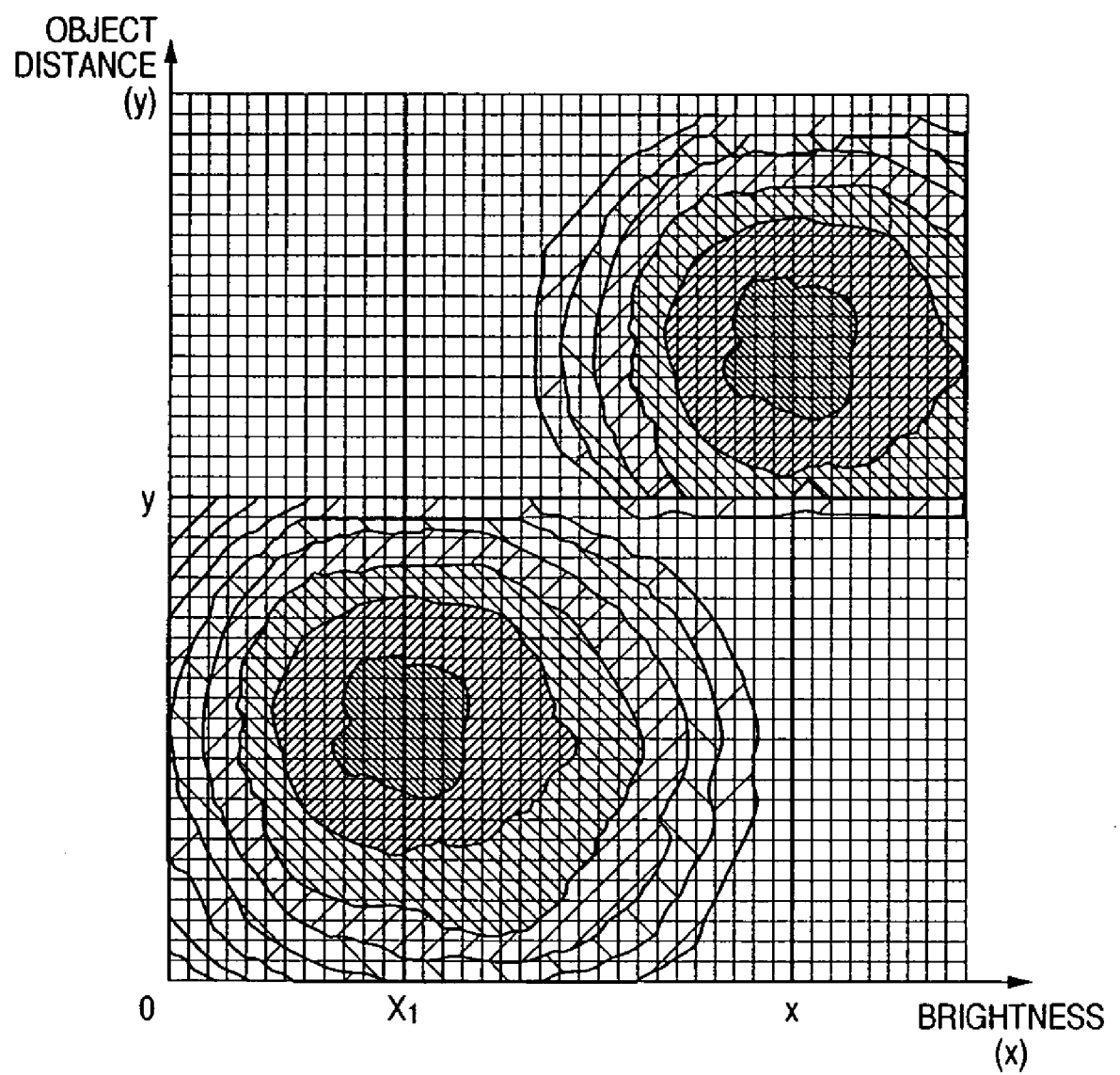
FIG. 2 is a view showing an example of a database stored in an iSAPS unit 105.
Figure 3:
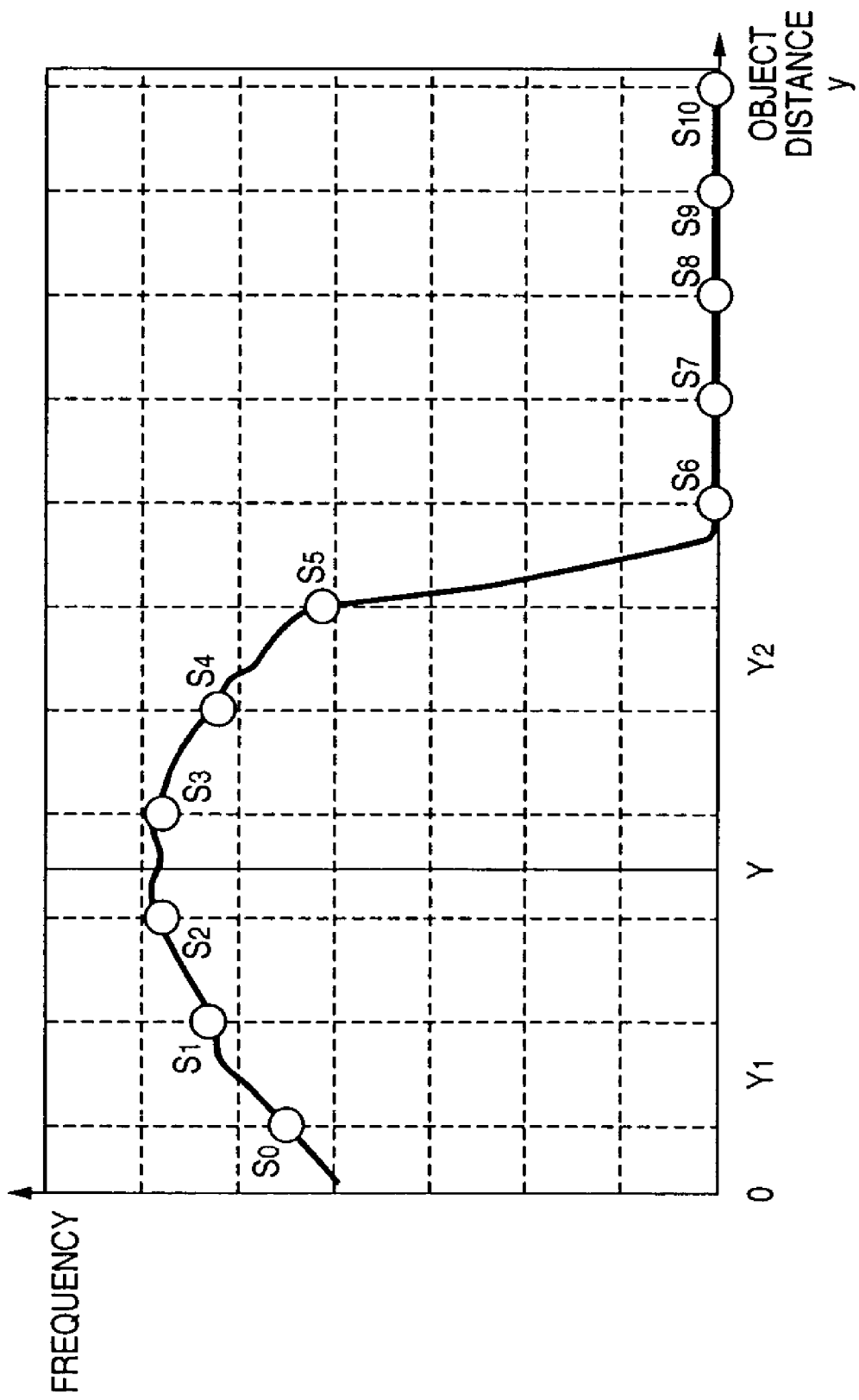
FIG. 3 is a graph showing an example of the relationship between the object distance and the photographing frequency at brightness value X1.

The iSAPS unit 105 stores a database as shown in FIG. 2. This database represents the frequency of photographing at a given object distance with a given object brightness. As the frequency comes closer to the center of the circle (the color becomes darker), the frequency of past photographing is higher. FIG. 3 is a graph at X1 in FIG. 2. S0 to S10 in FIG. 3 are sampling points for detecting an in-focus position.

Figure 4:
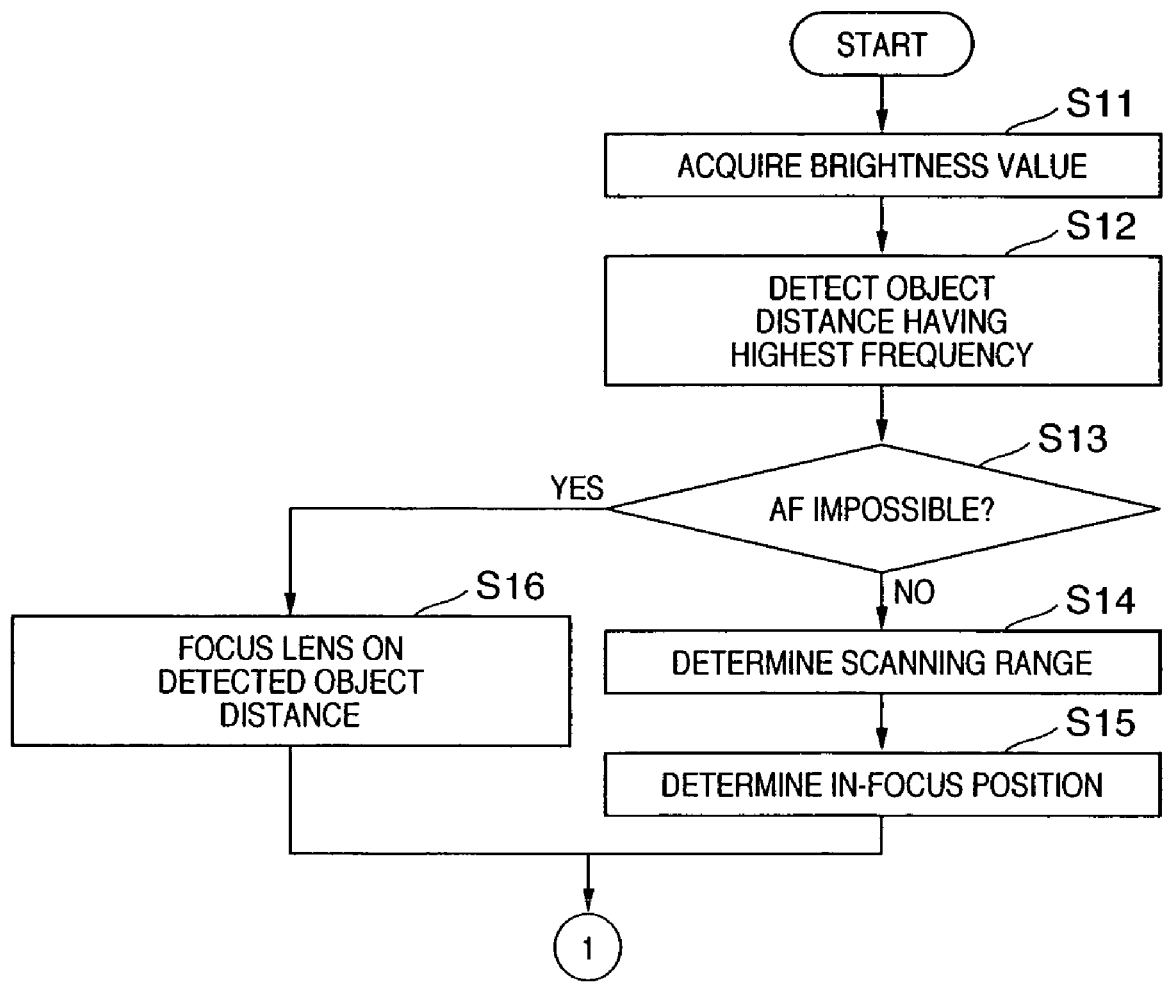
FIG. 4 is a flow chart showing operation processing of automatic focus adjustment of the image sensing apparatus according to the first embodiment.

FIG. 4 is a flow chart showing operation processing when the focus of the image sensing apparatus according to the first embodiment is automatically adjusted.

In step S11, the AE processor 104 obtains an object brightness value. In step S12, a distance Y (see FIG. 3) having the highest photographing frequency is detected using the database of FIG. 2 from object distances corresponding to the brightness value obtained in step S11.

In step S13, whether it is difficult to detect an image signal having the high-frequency portion of the object due to, e.g., an excessively low object brightness and automatic focus adjustment is impossible is determined.

If adjustment is possible, the flow advances to step S14 to limit a predetermined brightness range of Y1 to Y2 (S1 to S4) that is centered on the detected object distance Y to the focus lens scanning range, thereby setting the brightness range (i.e., the focus lens is driven within a range where the lens is focused at the object distances Y1 to Y2). The flow advances to step S15 to actually scan the focus lens within the range, and determine as a focus lens position a position where the largest number of image signals having the high-frequency portion of the object is detected.

If adjustment is impossible, the flow advances to step S16 to determine a focus lens position so as to adjust the focus to the detected object distance, and drive the focus lens to the position.

Figure 5:
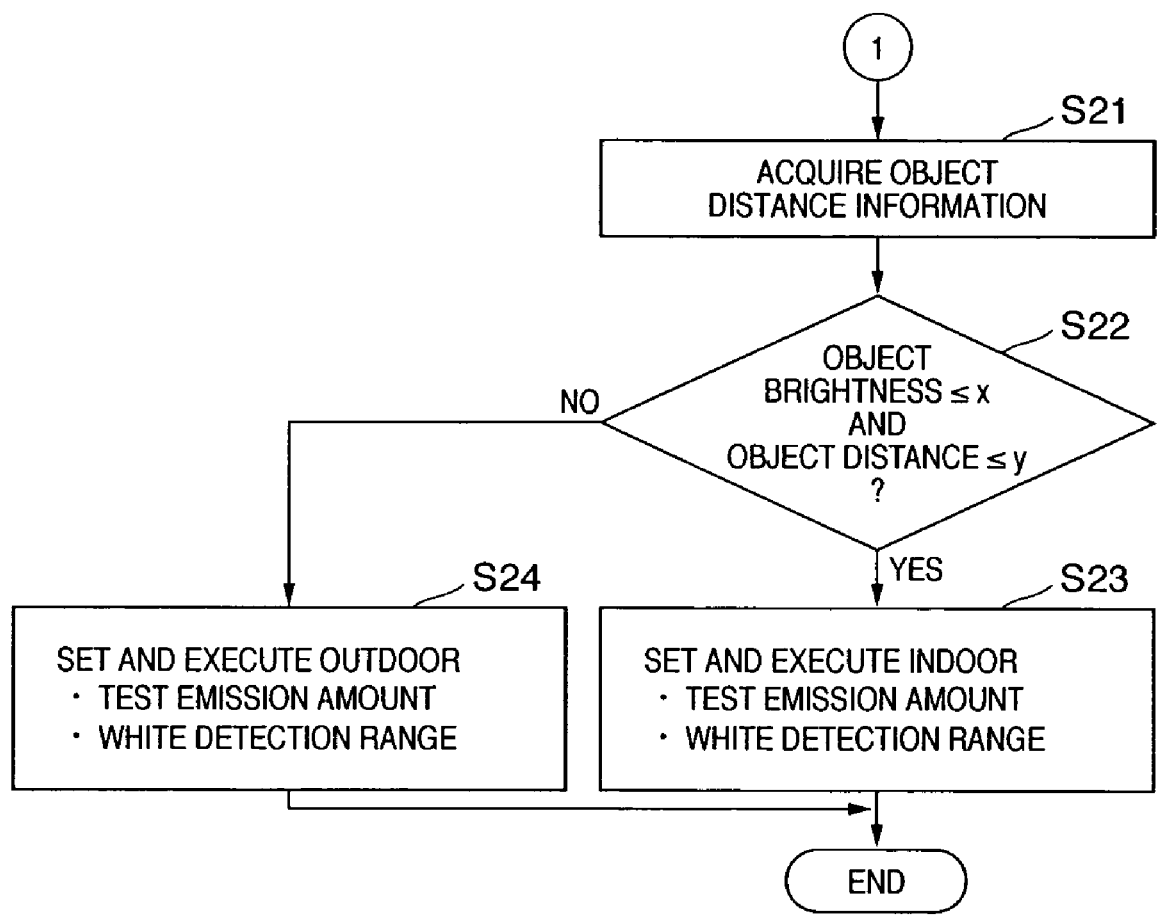
FIG. 5 is a flow chart showing operation processing of setting the test emission amount and white detection range of the image sensing apparatus according to the first embodiment.

A method of setting the test emission amount and the white detection range of image data according to the first embodiment will be explained with reference to the operation processing flow chart of the image sensing apparatus in FIG. 5.

In step S21, an object distance corresponding to the in-focus position of the focus lens adjusted by the AE processor 104 is detected (in order to increase the processing speed, this object distance may be replaced with an object distance having the highest photographing frequency that is detected in step S12). The flow advances to step S22 to determine whether the object brightness value is equal to or less than x and the object distance is equal to or less than y.

If YES in step S22, the flow advances to step S23. The EF processor 107 sets, to an indoor value, a test emission amount for setting an emission amount in actual exposure of taking a picture to be actually recorded. A flash 108 then emits light. An actual emission amount is determined by calculation processing using a brightness obtained by photometry in synchronism with test emission and an external light intensity obtained by photometry before test emission. Note that an indoor test emission amount is set smaller than an outdoor test emission amount. For follow-up by the color temperature range of a fluorescent lamp, the white balance processor 109 sets a range wider than the outdoor white detection range (a in FIG. 6). The white balance processor 109 controls the white balance of an actual exposure image signal on the basis of an image signal falling within the set white detection range from the input digital image signal.

If NO in step S22, the flow advances to step S24. The EF processor 107 sets, to an outdoor value, a test emission amount for setting an emission amount in actual exposure of taking a picture to be actually recorded. The flash 108 then emits light. An actual emission amount is determined by calculation processing using a brightness obtained by photometry in synchronism with test emission and an external light intensity obtained by photometry before test emission. The white balance processor 109 sets a white detection range to be followed by the outdoor color temperature range (b in FIG. 6). The white balance processor 109 controls the white balance of an actual exposure image signal on the basis of an image signal falling within the set white detection range from the input digital image signal.

Figure 6:
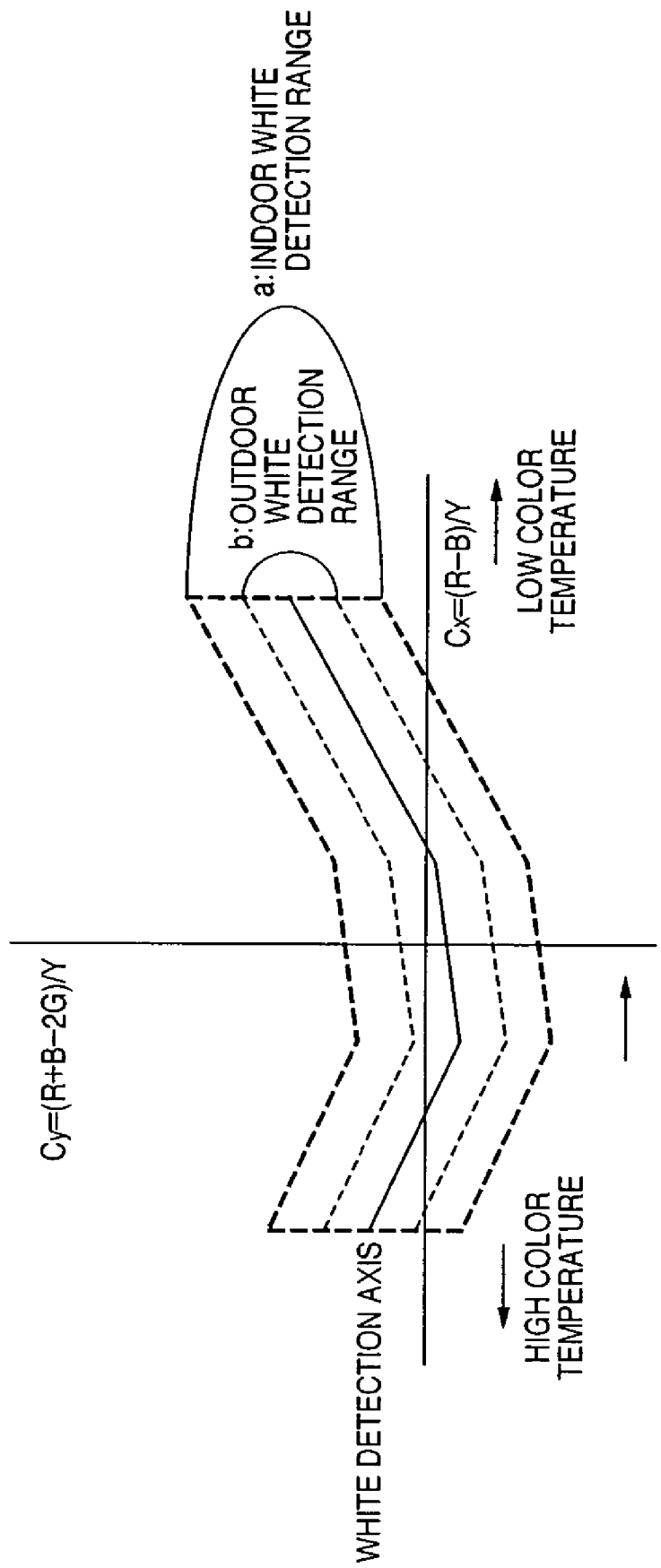
FIG. 6 is a graph showing a setting example of the white detection range.

A detailed method of calculating a white balance control coefficient will be explained. FIG. 6 shows indoor and outdoor white detection ranges. In FIG. 6, the X-axis (Cx) corresponds to the color temperature of the light source, and the Y-axis (Cy) corresponds to the correction amount in the green direction. The first embodiment will exemplify an image sensing element using a primary color filter. Note that $$Cx=(R-B)/Y$$

$$Cy=(R+B-2G)/Y$$

$$Y=(R+G+B)/2 \qquad (1)$$

Figure 7:
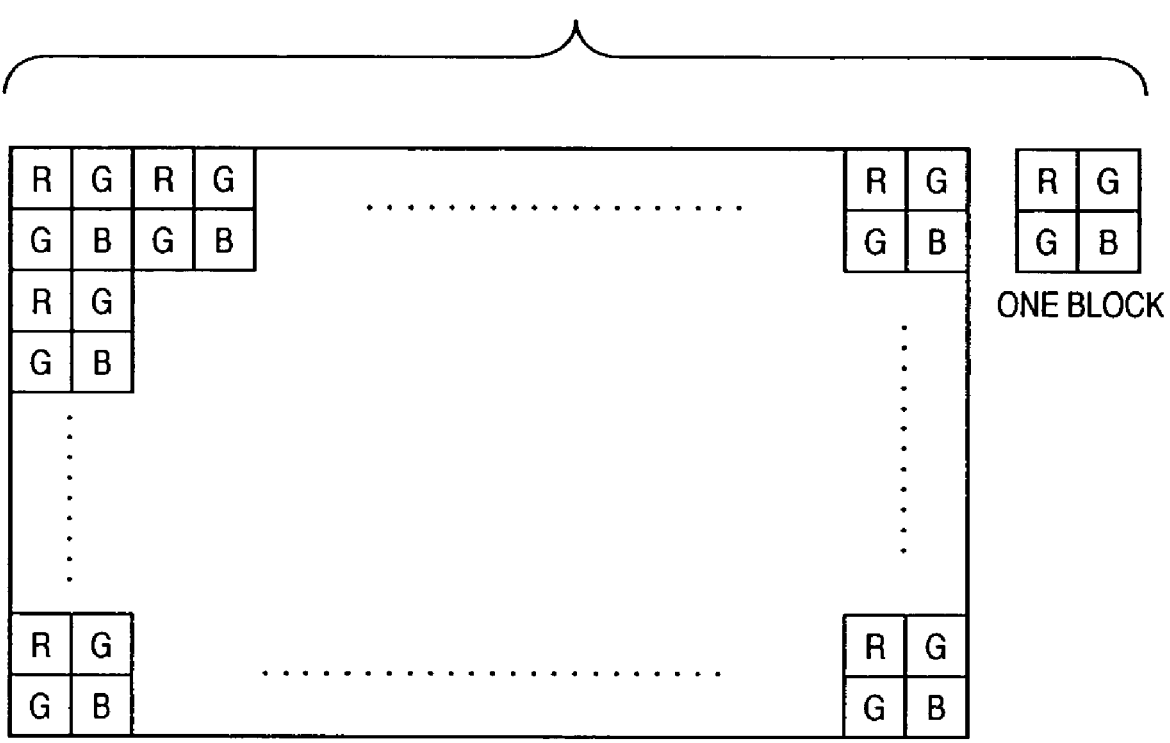
FIG. 7 is a view showing an example of a detection block.

An input signal from the image sensing element is divided into arbitrary blocks, as shown in FIG. 7. A white evaluation value (Cx,Cy) is calculated for each block, and whether the value falls within the white detection range in FIG. 6 is determined. As described above, the white detection range is set to the white detection range (a) for "indoor" determination and the white detection range (b) for "outdoor" determination. The integral values (SumRw, SumGw, and SumBw) of output values (R(i), G(i), and B(i)) from the respective color filters of blocks within the range, and a total sample number SampleWNum are calculated:

$$SumRw = \Sigma R(i)$$
$$SumGw = \Sigma G(i)$$
$$SumBw = \Sigma B(i)$$
$$SampleWNum = \Sigma Sample(i) \quad (2)$$

White balance coefficients are calculated from the integral values:

$$WBr = 1/(SumRw/SampleWNum)$$
$$WBg = 1/(SumGw/SampleWNum)$$
$$WBb = 1/(SumBw/SampleWNum) \quad (3)$$

By using these white balance coefficients, the white balance processor 109 can properly adjust the white balance.

The white balance detection range is not limited to FIG. 6. The outdoor white detection range may be set to a high-color-temperature range so as to follow a high color temperature, and the indoor white detection range may be set to a lower color temperature than the outdoor white detection range.

As described above, the automatic focus adjustment time can be shortened by estimating an in-focus position on the basis of the object brightness value and the photographing frequency corresponding to the brightness value and narrowing the focus lens scanning range.

Indoor or outdoor photographing is determined on the basis of the object brightness value and the object distance corresponding to the in-focus position. A white detection range for calculating a proper flashlight amount and white balance control coefficient can be set, realizing quick, appropriate processing.

Second Embodiment

The second embodiment concerns an image sensing apparatus having a learning function capable of storing and updating status data (object distance, image brightness, and photographing frequency) obtained every photographing in a database (storage device) 113 of an iSAPS unit 105. The second embodiment can provide an image sensing apparatus which reflects a different photographing taste for each photographer and is convenient for the photographer.

Figure 8:
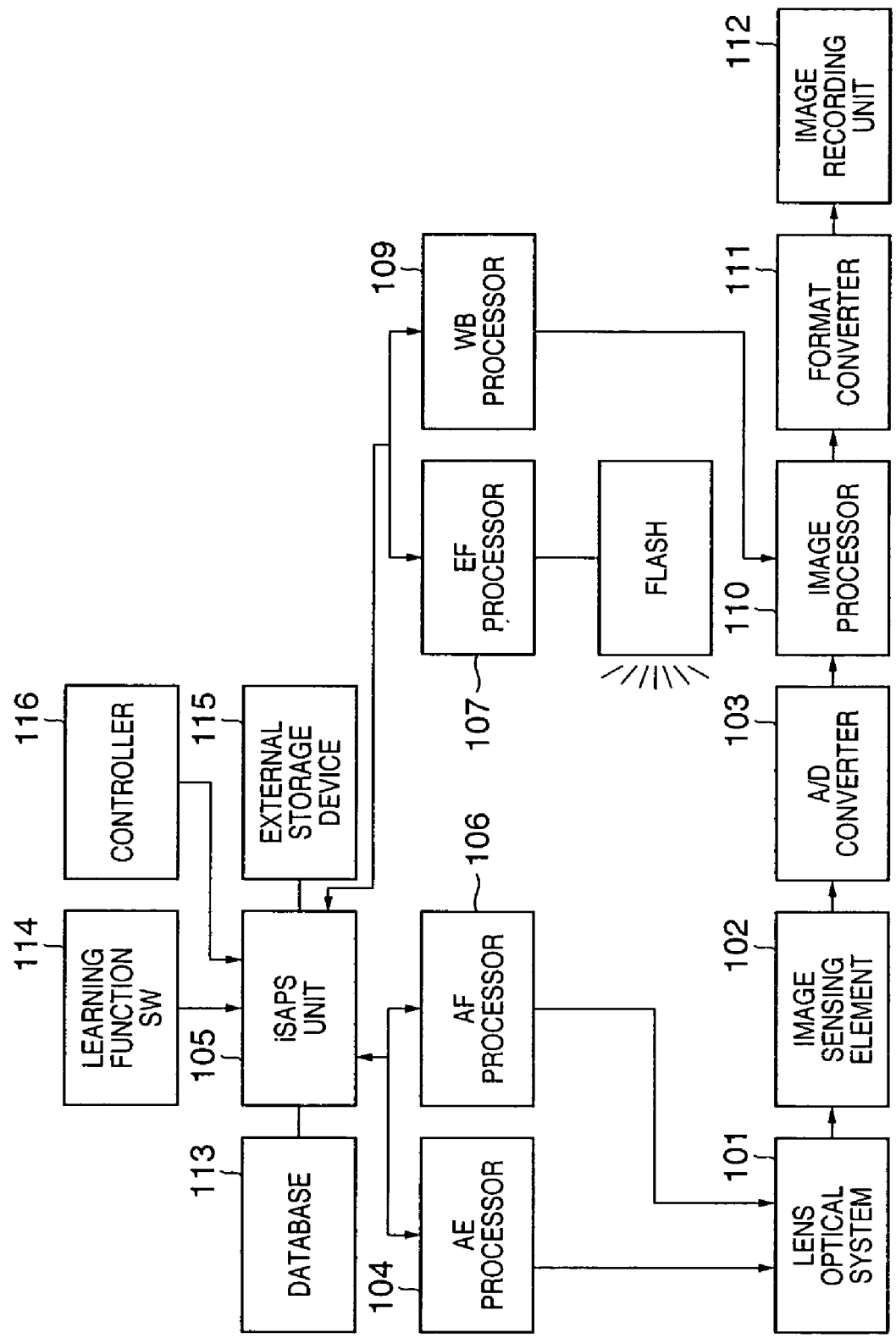
FIG. 8 is a block diagram showing an image sensing apparatus according to the second embodiment.

FIG. 8 is a block diagram showing an image sensing apparatus according to the second embodiment. Blocks having the same reference numerals as those in FIG. 1 execute the same processes, and a description thereof will be omitted.

The image sensing apparatus according to the second embodiment comprises a learning function SW 114, and whether to execute the learning function for the iSAPS unit 105 is controlled.

When the learning function is set ON for the iSAPS unit 105, distance information Y obtained by an AF processor 106 and a brightness value X obtained by an AE processor 104 are newly stored in the storage device 113, updating the stored database.

Whether to change a threshold (x,y) used in "outdoor/indoor" determination shown in FIG. 3 is comprehensively determined from a numerical value representing correctness of "indoor/outdoor" prediction based on an (x,y) value obtained by an EF processor 107 and WB processor 109, and an indoor or outdoor state near the (x,y) value. If the threshold is determined to be changed, the database stored in the storage device 113 is updated.

Figure 9A:
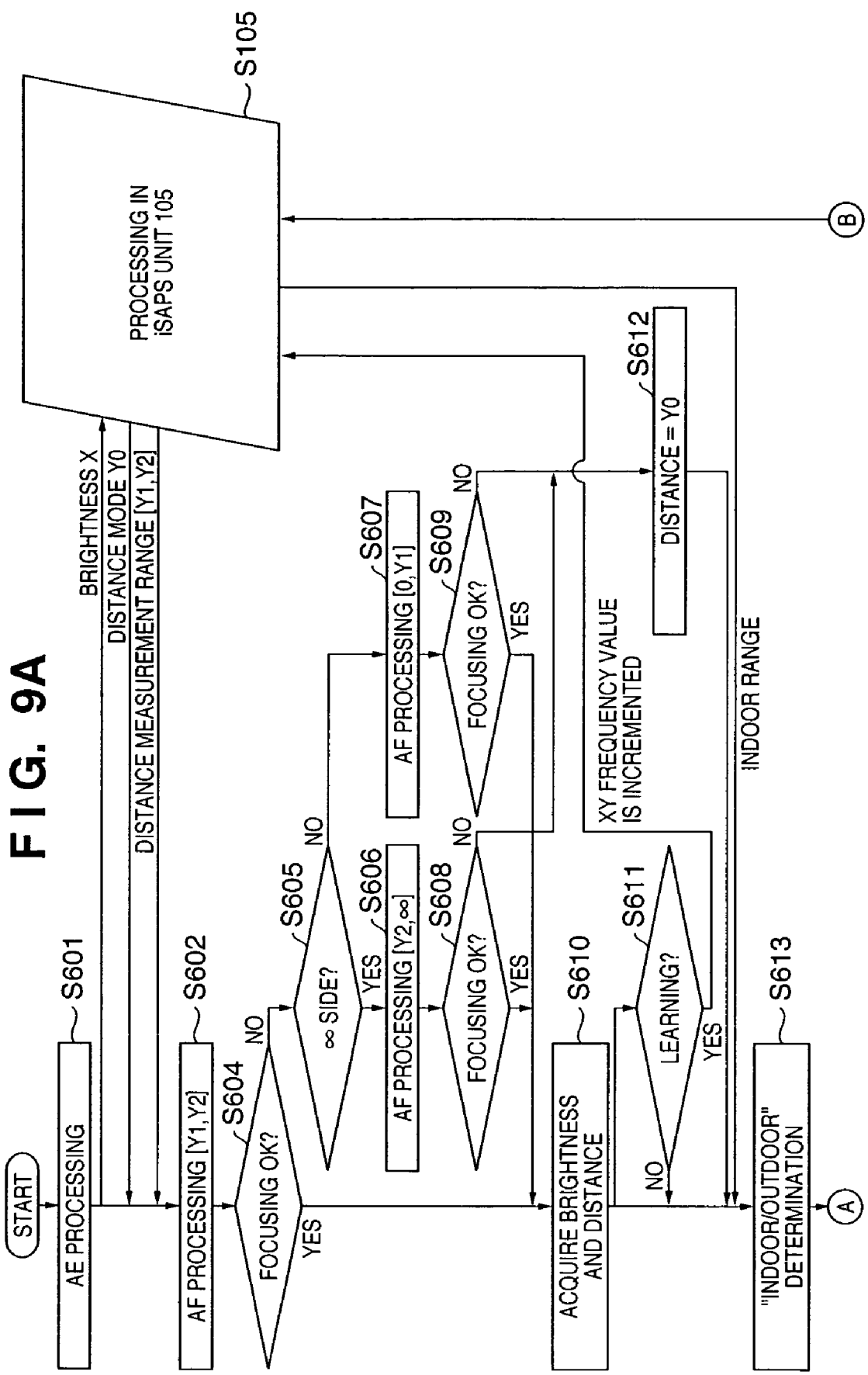
FIGS. 9A and 9B are flow charts showing operation processing of the image sensing apparatus according to the second embodiment.
Figure 9B:
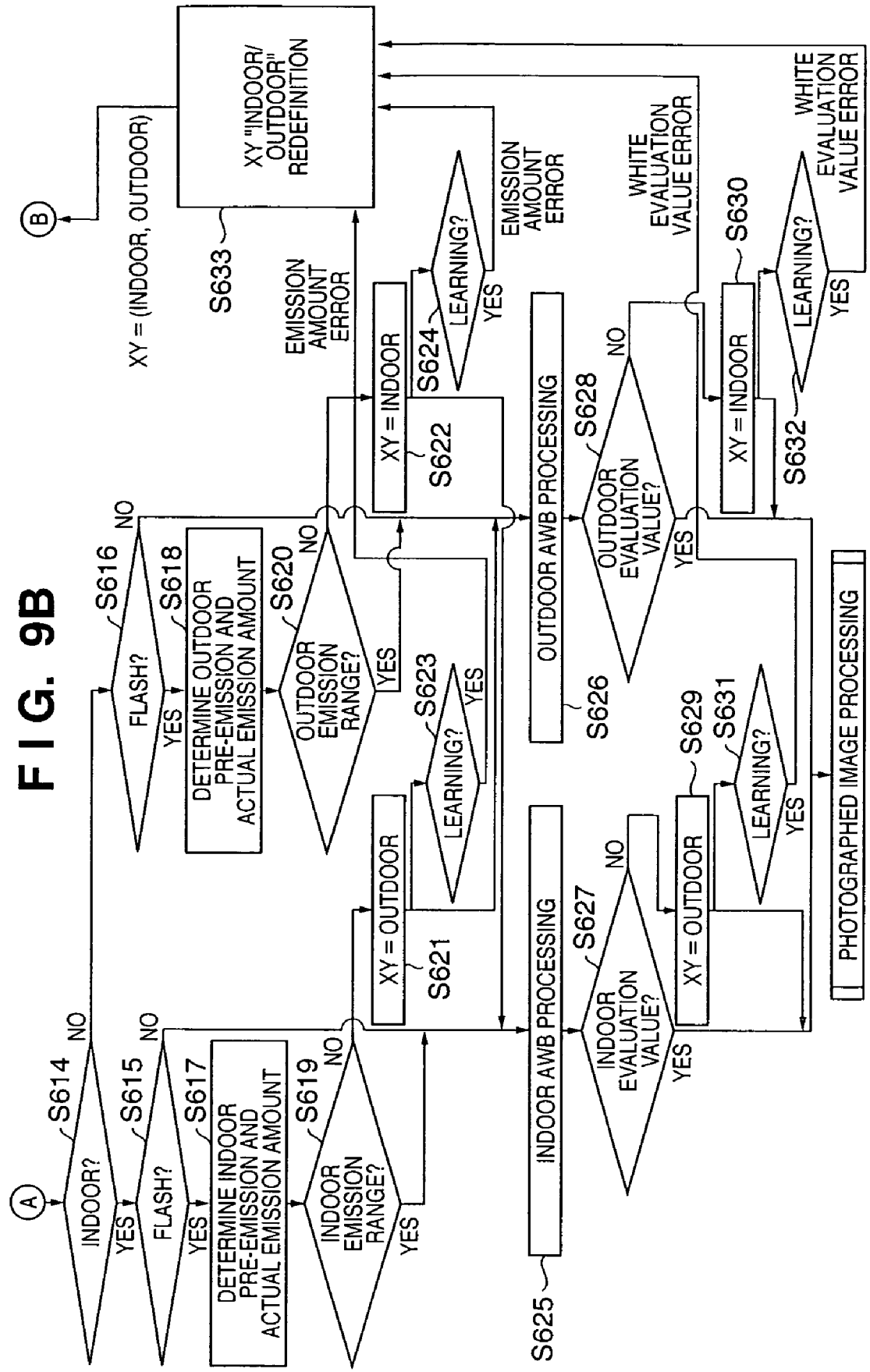

Operation processing of the image sensing apparatus according to the second embodiment will be explained with reference to the flow charts of FIGS. 9A and 9B.

In step S601, the AE processor 104 obtains an object brightness value X. In processing of step S603 by the iSAPS unit 105, the iSAPS unit 105 searches the database 113 for an object distance Y0 having the highest frequency among brightness values corresponding to the obtained brightness value X. The iSAPS unit 105 obtains an object distance range (Y1,Y2) where the frequency value exceeds a given threshold around the object distance Y0.

In step S602, the AF processor 106 receives the obtained object distance Y0 having the highest frequency and the value of the object distance range (Y1,Y2) from the iSAPS unit 105. The AF processor 106 sets as a scanning range a focus lens driving range corresponding to the object distance range (Y1, Y2), and performs focusing operation. In the example of FIG. 3, steps S1 to S4 define an object distance range corresponding to the scanning range.

If focusing operation ends in step S604, the flow advances to step S610. If no in-focus position is obtained within the scanning range, the flow advances to step S605.

In step S605, a change in the focusing degree of the focus lens at each position is confirmed, and whether the in-focus position is closer to infinity or minimum object distance with respect to (Y1,Y2) is determined. If the in-focus position is determined to exist at infinity, the flow advances to step S606 to set the object distance range corresponding to the scanning range to (Y2,∞), and start focusing operation again. If focusing operation is completed in step S608, the flow advances to step S610; if NO, to step S612.

If the in-focus position is determined in step S607 to exist at minimum object distance, the object distance range corresponding to the scanning range is set to (0,Y1), and focusing operation is performed again. If focusing operation is completed in step S609, the flow advances to step S610; if NO, to step S612.

In step S610, an object distance Y corresponding to the in-focus position of the focus lens is acquired. If the learning function SW 114 is ON in step S611, the acquired object distance Y and the brightness value X acquired in step S601 are output to the iSAPS unit 105 to update data in the database 113.

In processing of step S612 when no in-focus position is obtained, the in-focus position is made to correspond to the object distance Y=Y0 obtained in step S602, and the focus lens is driven.

In step S613, whether the object is indoor or outdoor is determined from the obtained brightness value X and distance information Y. As determination information, the threshold (x,y) stored in the database 113 from the iSAPS unit 105 is used.

If the object brightness value X is equal to or less than x and the object distance Y is equal to or less than y, indoor photographing is determined in step S614, and the flow advances to step S615. If NO in step S614, the flow advances to step S616.

In steps S615 and S616, whether to emit light from the flash is determined. If YES in step S615 or S616, the flow advances to indoor emission and actual emission amount determination processing in step S617 or outdoor pre-emission and actual emission amount determination in step S618. If NO in step S615 or S616, the flow advances to indoor AWB processing in step S625 or outdoor AWB processing in step S626.

In steps S617 and S616, a test emission amount for setting an emission amount in actual exposure is determined in accordance with the difference between outdoor photographing and indoor photographing. The test emission amount is set small for indoor photographing and large for outdoor photographing. An actual emission amount is determined by calculation processing using a brightness value obtained by photometry in synchronism with test emission and an external light intensity value obtained by photometry before test emission.

After the actual emission amount is determined, whether "indoor/outdoor" prediction in step S614 is correct is determined. This is determined from the error between an emission amount predicted on the basis of an external light intensity value obtained by photometry before test emission and an object distance obtained by distance measurement, and an actual emission amount attained from a brightness value obtained by photometry along with test emission and an external light intensity value obtained by photometry before test emission.

If "indoor/outdoor" determination is determined to be correct, the flow advances to indoor AWB processing in step S625 or outdoor AWB processing in step S626. If "indoor/outdoor" determination is determined not to be correct, the flow advances to step S621 or step S622. A numerical value representing the degree of incorrectness of "indoor/outdoor" determination is acquired as an error amount. This error amount is, e.g., an error amount between an emission amount predicted in test emission and an actual emission amount, as described above.

Whether the learning function SW 114 in FIG. 1 is ON is determined in step S623 or S624, and if YES, the error amount is sent for XY "indoor/outdoor" redefinition in processing 633 and used in processing of determining whether to change the state in which the (x,y) value represents "indoor" or "outdoor".

If photographing is determined in step S621 to be originally outdoor photographing, the flow advances to outdoor AWB processing in step S626. If photographing is determined in step S622 to be originally indoor photographing, the flow advances to indoor AWB processing in step S625.

In step S625, indoor AWB (Automatic White Balance) processing is performed. In step S626, outdoor AWB (Automatic White Balance) processing is performed. White balance processes in steps S625 and S626 are the same as those in steps S23 and S16 described in the first embodiment, and a description thereof will be omitted.

In step S627 or S628, whether "indoor/outdoor" prediction in step S619 or S620 is correct is determined from the result of processing in step S625 or S626. This is determined from the distribution of color information (Cx,Cy) values given by equation (1) on the graph shown in FIG. 6 (for example, if values are distributed in a wide range along the Cy axis, indoor photographing is determined, and if values are distributed within a narrow range, outdoor photographing is determined), or from the white balance coefficients calculated by equations (3). If "indoor/outdoor" determination is determined to be correct, a predetermined photographed image is processed to create a proper output image signal. If "indoor/outdoor" determination is determined not to be correct, the flow advances to step S629 or S630. A numerical value representing the degree of incorrectness of "indoor/outdoor" determination is acquired as an error amount. As described above, the variance of (Cx,Cy) values given by equations (1) on the graph shown in FIG. 6, or the distribution number in each of blocks prepared by dividing the graph of FIG. 6 may be obtained, and the area of a block which exceeds a given threshold may be obtained. In addition to them, a unique function using the white balance coefficients calculated by equations (3) may be used.

Whether the learning function SW 114 in FIG. 1 is ON is determined in step S631 or S632, and if YES, the flow advances to XY "indoor/outdoor" redefinition in step S633. Whether to change the (x,y) value from indoor or outdoor processing to outdoor or indoor processing is determined on the basis of data on the error amount and accumulated data.

In step S633, whether to change the (X,Y) value defined as the indoor/outdoor threshold is comprehensively determined on the basis of a flash emission amount, a flash emission amount obtained when the "indoor/outdoor" determination result in white balance processing is determined to be incorrect, or the error amount of white balance processing. For example, if the error amount is larger than a given value and is determined to be changed, the threshold (X,Y) held by the iSAPS unit 105 is defined again by changing it by a predetermined amount.

The operation of the image sensing apparatus according to the second embodiment has been described.

In the above description, learned data is stored in the storage device 113 of the iSAPS unit 105. Alternatively, an external storage device 115 may be separately connected to the iSAPS unit 105 in FIG. 8. Under the control of a controller 116 in the iSAPS unit 105, the external storage device 115 allows writing in the external storage device 115 the database in FIG. 2 which is stored in the storage device 113, and reading out the database stored in the external storage device 115 to the storage device 113. Accordingly, the database can be shared between different image sensing apparatuses or photographers who perform different photographing operations, and common photographing conditions can be obtained between different image sensing apparatuses. The image sensing apparatus can always be returned to an initial state by storing initial data before learning in the external storage device 115.

The database stored in the storage device 113 and a plurality of databases stored in the external storage device 115 can be edited into one database, and the resultant database can be written in either or both of the storage device 113 and external storage device 115. As a detailed database editing method, frequency values at (x,y) values in the editing source database are added for the brightness value x and distance information y. In this manner, a plurality of databases can be edited into one database, and photographing can be done using the common database between different image sensing apparatuses or photographers who perform different photographing operations.

In the second embodiment of the present invention, the determination condition representing an indoor or outdoor state in the iSAPS unit 105 takes only two values "YES" and "NO". Instead, indoor photographing and outdoor photographing may be made to correspond to 1 and 0, respectively, and data having consecutive state coefficients from 1 to 0 may be held. In this case, indoor or outdoor pre-emission and the test emission amount for determining an actual emission amount in step S617 or S618, and the white detection range of indoor or outdoor AWB processing in step S625 or S626 are successively changed from indoor data to outdoor data in correspondence with a change in the state coefficient from 1 to 0. If the indoor or outdoor state of (X,Y) is determined in step S633 to be changed on the basis of the flash emission amount or the error amount of white balance processing, the state coefficient serving as an error amount function is changed as a continuous quantity between 1 and 0.

As described above, the second embodiment can provide an image sensing apparatus which copes with the taste of each photographer by performing processing of the image sensing apparatus.

Third Embodiment

The third embodiment is a modification to the second embodiment. In the third embodiment, the user confirms a photographed image, and selects whether to add data on the image sensing condition of the photographed image to a database.

Figure 10:
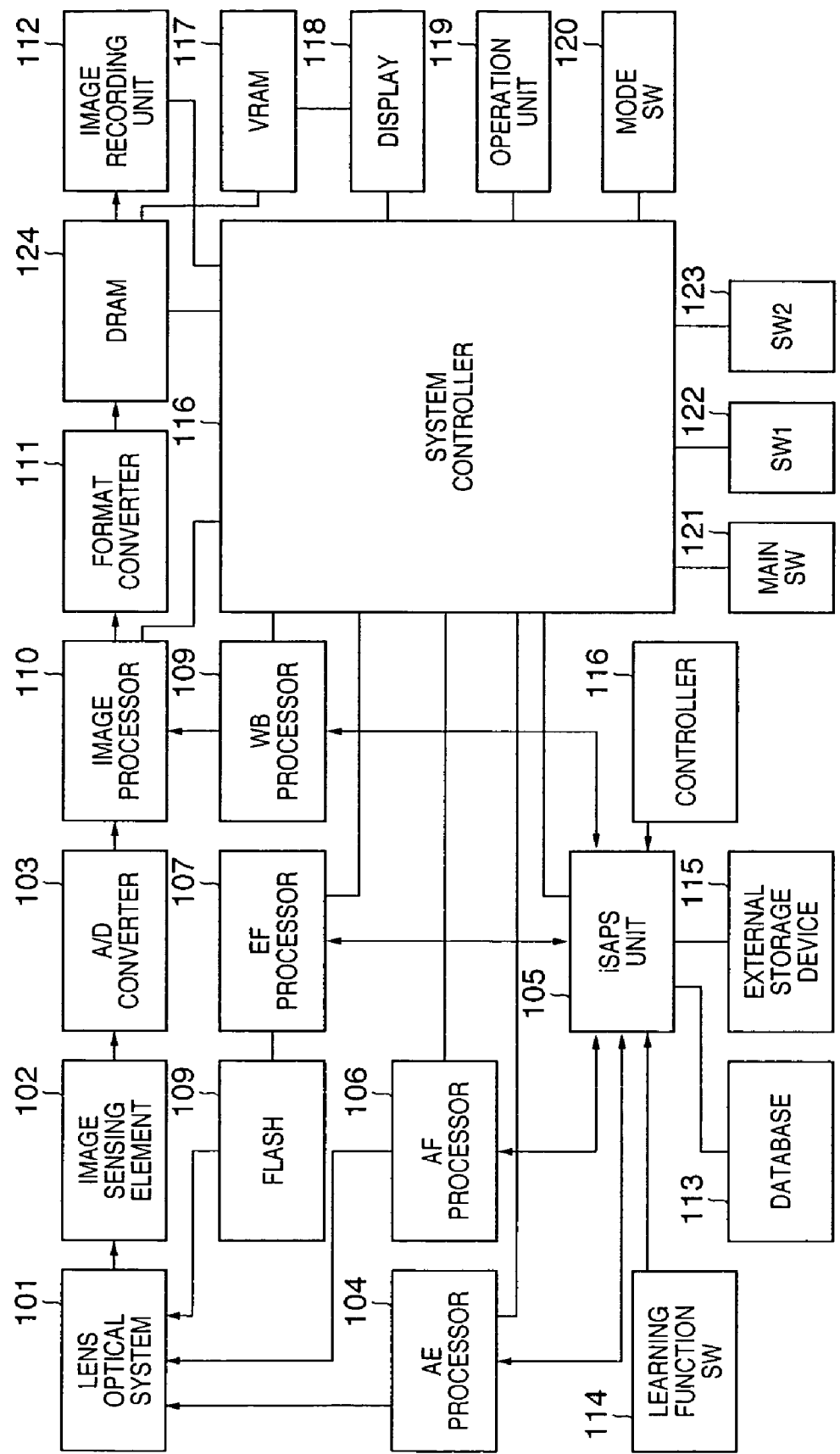
FIG. 10 is a block diagram showing an image sensing apparatus according to the third embodiment.

FIG. 10 is a block diagram showing an image sensing apparatus according to the third embodiment. The same reference numerals as those in the above embodiments denote blocks which perform the same processes, and a description thereof will be omitted.

In FIG. 10, a system controller 116 controls the system of the whole image sensing apparatus including a photographing sequence (the second embodiment has not described such system controller, but comprises the same arrangement as the system controller 116). A VRAM 117 is an image display memory, and a display 118 is, e.g., an LCD which displays an image, an operation assistant display, and the state of the image sensing apparatus. An operation unit 119 is a member for externally manipulating a camera. A mode switch 120 switches between a photographing mode in which an image is photographed and recorded, and a playback mode in which a photographed image is played back. A main switch 121 is a switch for turning on the system, a switch (SW1) 122 is a switch for performing photographing standby operation such as AF or AE, and a switch (SW2) 123 is a photographing switch for performing photographing after operation of SW1. A DRAM 124 is used as a high-speed buffer which is a temporary image storage device, or a work memory for compressing/decompressing an image.

The operation unit 119 includes the following members: a menu switch for various settings including the photographing function of the image sensing apparatus and image setting, a cross key for selecting a playback image, a zoom lever for designating zoom operation of a photographing lens, and a switch for switching between photographing modes such as a program photographing mode, landscape photographing mode, and portrait photographing mode.

Figure 11:
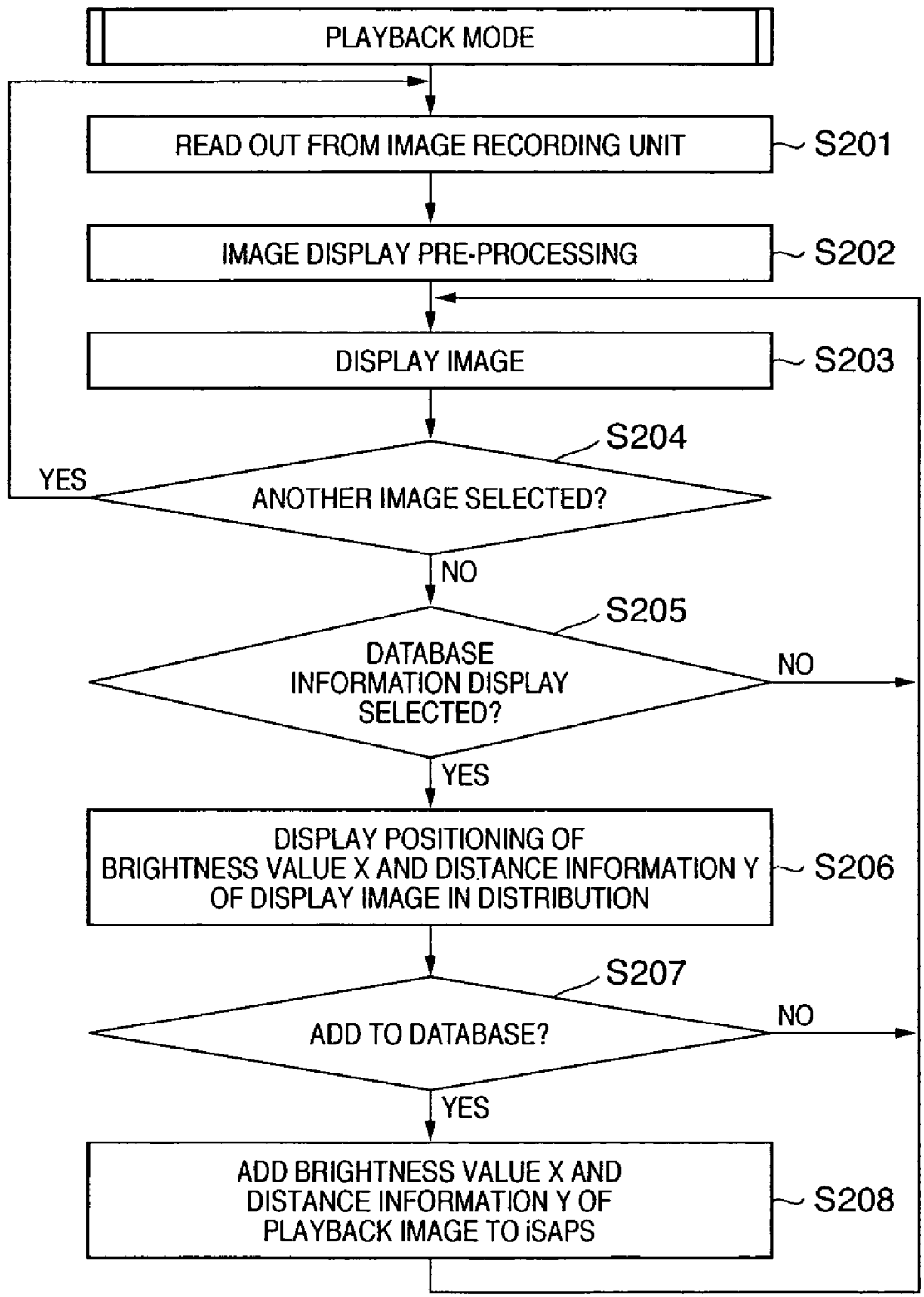
FIG. 11 is a flow chart showing operation processing in the playback mode of the image sensing apparatus according to the third embodiment.

FIG. 11 is a flow chart showing operation processing in a playback mode in which an image is played back in the image sensing apparatus according to the third embodiment. Operation processing according to the third embodiment will be explained with reference to FIG. 11.

In step S201, an image recorded in an image recording unit 112 is read out in accordance with selection operation by the user. In step S202, pre-processing for display on the display 118 is executed. More specifically, the image read out in step S201 is temporarily stored in the DRAM 124, image data decompression processing and sampling processing for display on the display 118 are performed, and the resultant image is stored in the VRAM 117.

In step S203, the image stored in the VRAM 117 undergoes video processing to display the image on the display 118. The flow advances to step S204 to determine whether display of another image is input from the operation unit 119 by user operation. If another image is selected, the flow advances to step S201; if NO, to step S205.

Figure 12:
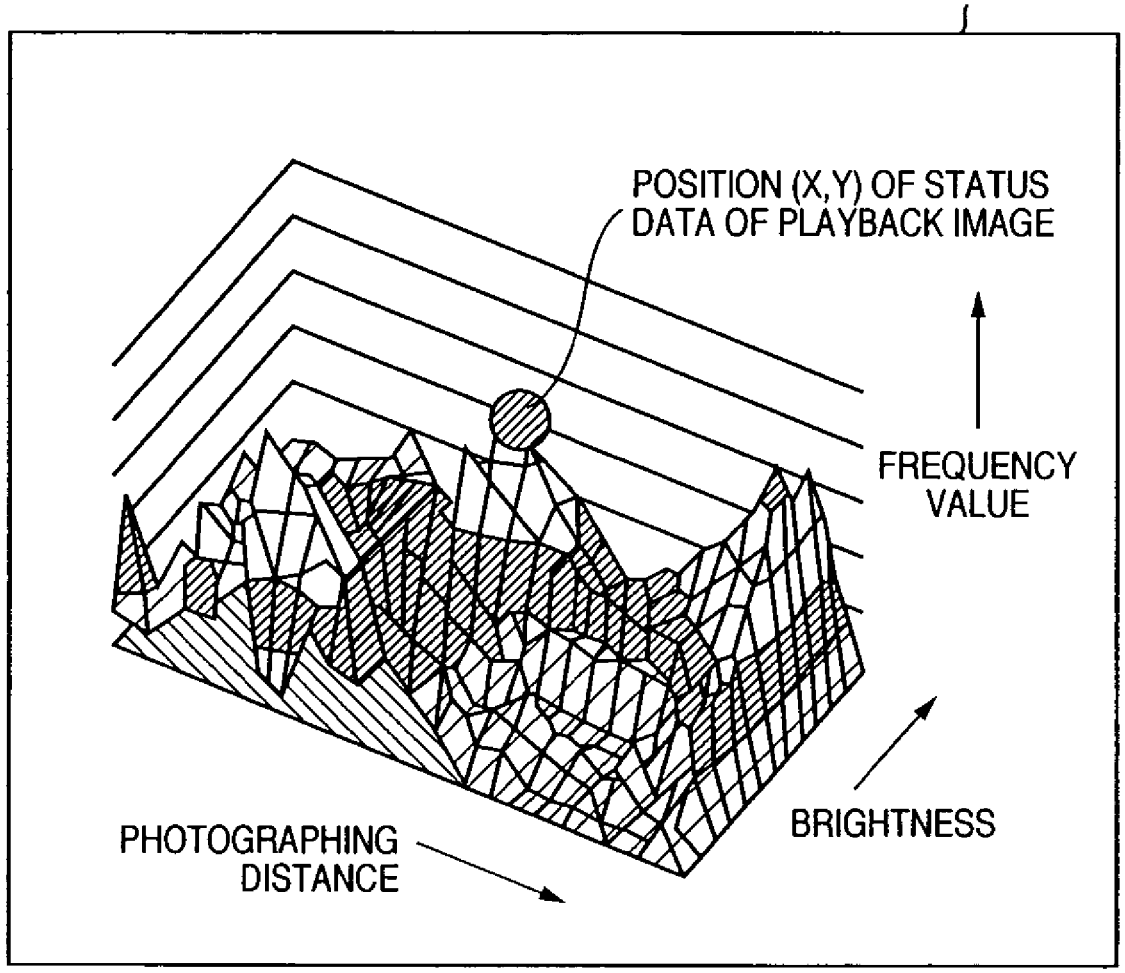
FIG. 12 is a view showing an example of a database stored in an iSAPS unit 105 (storage device 113)

In step S205, whether a database information display shown in FIG. 12 has been selected as a menu item by operating, e.g., the menu switch of the operation unit 119 is determined. If YES in step S205, the flow advances to step S206; if NO, to step S203.

In step S206, a brightness value x and object distance information y as photographing status data of the image played back in step S203 are read out from the header of the played-back image file. The database information in FIG. 12 is read out from the storage device 113, and a marker is displayed at a position corresponding to the brightness value x and object distance information y of the playback image in the database. Note that FIG. 12 is equivalent to the three-dimensional view of the database shown in FIG. 2.

In step S207, whether it has been selected by user operation using the operation unit 119 to add to the database the brightness value x and object distance information y corresponding to the playback image is determined. If YES in step S207, the flow advances to step S208; if NO, to step S203. In step S208, the brightness value x and object distance information y corresponding to the playback image are added to the database. That is, the frequency value at (x,y) corresponding to the playback image is incremented by one, and the flow returns to step S203.

As described above, according to the third embodiment, while the photographer sees a playback image, he/she can selectively add the image to the database depending on the degree of satisfaction. The photographer can create an appropriate database, improving convenience. The positioning of image sensing conditions upon photographing a playback image in the database can be confirmed.

Also, according to the third embodiment, the image sensing conditions of an image photographed by another image sensing apparatus can also be added to the database.

Figure 13:
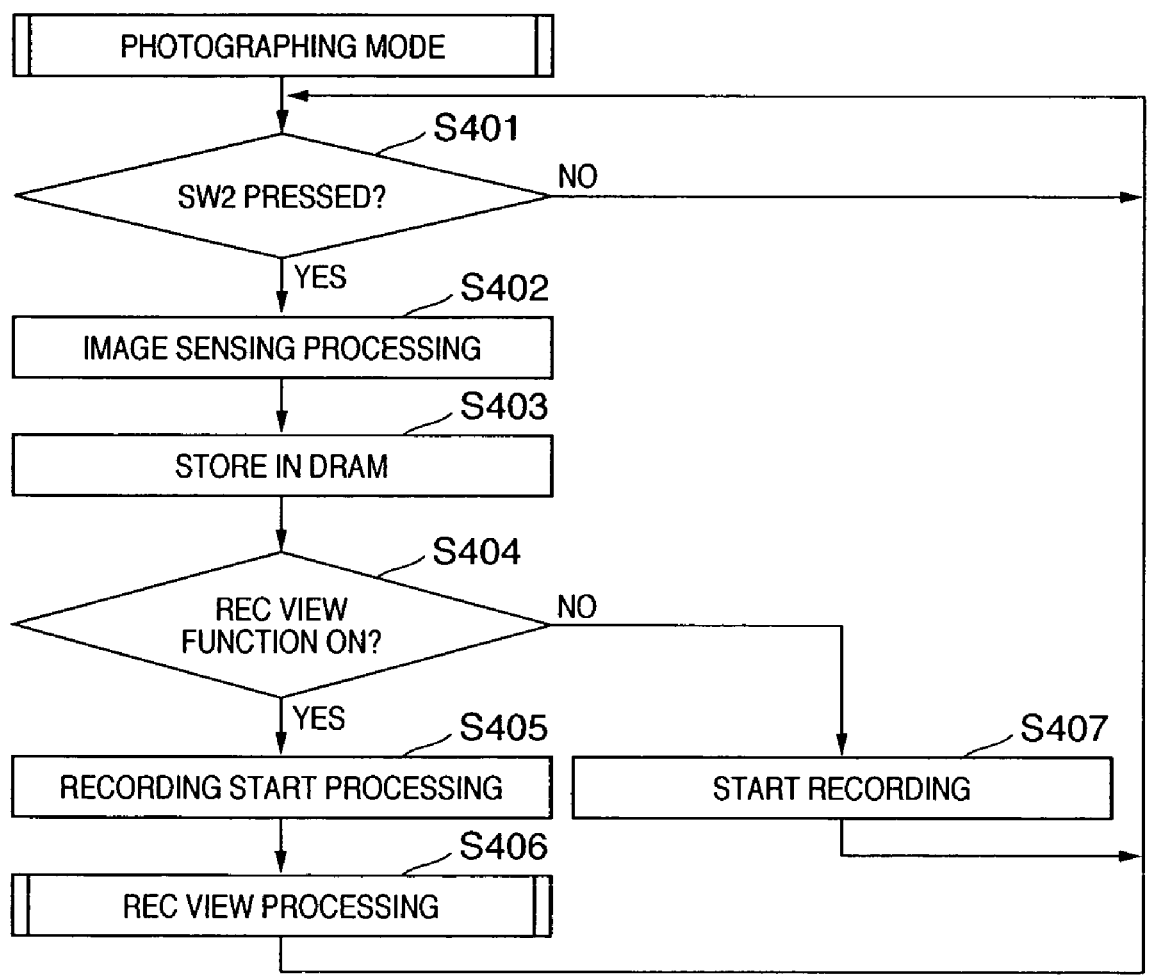
FIG. 13 is a flow chart showing operation processing in the photographing mode of the image sensing apparatus according to the third embodiment.
Figure 14:
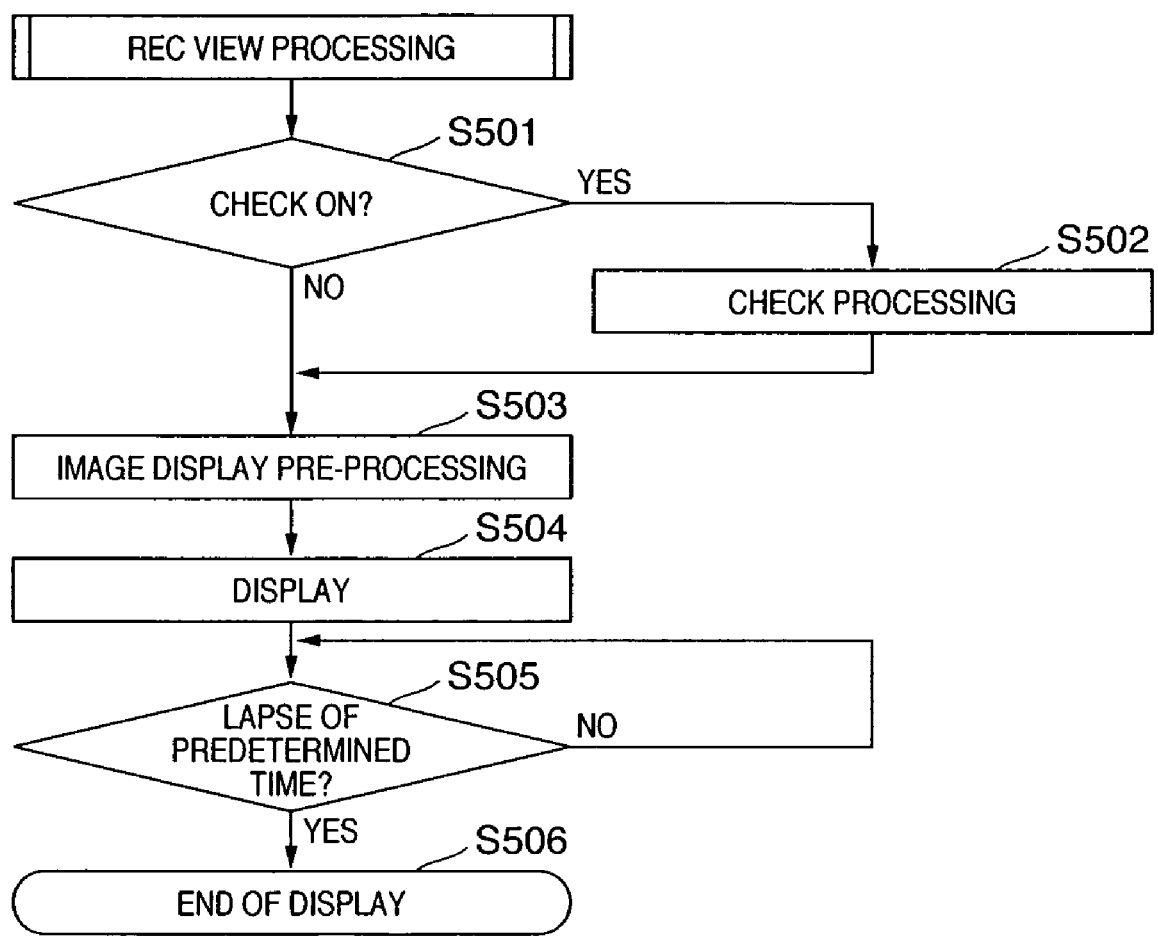
FIG. 14 is a flow chart showing rec view processing according to the third embodiment.

In the third embodiment, processes as shown in FIGS. 13 and 14 may be done.

FIG. 13 is a flow chart showing operation processing in the photographing mode of the image sensing apparatus according to a modification to the third embodiment.

In step S401 of FIG. 13, whether SW2 has been pressed is determined. If YES in step S401, the flow advances to step S402; if NO, to step S401. In step S402, image sensing processing is performed to obtain an object image as an output image signal. In step S403, the obtained output image signal is temporarily stored in the DRAM 124.

In step S404, whether a rec view (processing of displaying an image immediately after photographing on the display 118 in order to cause the user to confirm the image) has been set is determined. If the rec view is ON, the flow advances to step S405; if NO, to step S407.

In step S405, recording start processing of recording an image stored in the DRAM 124 in the image recording unit 112 is executed. In step S406, rec view processing is done in parallel with recording processing in the image recording unit 112. After recording processing and rec view processing, the flow returns to step S401. The image stored in the DRAM 124 is recorded in the image recording unit 112 in step S407, and then the flow returns to step S401.

Rec view processing of step S406 in the flow chart of FIG. 13 will be explained with reference to the flow chart of FIG. 14.

In step S501, whether the image sensing conditions of an image to be displayed on the rec view have been set to be checked by setting using the operation unit 119 is determined. If YES in step S501, the flow advances to step S502; if NO, to step S503.

In step S502, the coincidence with the distribution of the entire database stored in the storage device 113 is examined for the brightness value X and distance information Y of the rec view image. The coincidence is examined by determining, for example, whether (X,Y) has a frequency value equal to or larger than a predetermined threshold.

In step S503, pre-processing for display on the display 118 is executed. In step S504, if the brightness value X and distance information Y are determined in step S502 to coincide with the database, "OK" representing coincidence is displayed at the same time as display of the rec view image, as shown in FIG. 15A (predetermined sound may be output from a sound generation portion such as a loudspeaker, or light may be emitted by a light-emitting portion such as an LED (not shown)). If NO in step S502, "NG" warning noncoincidence is displayed, as shown in FIG. 15B. Alternatively, a display which promotes addition of image sensing conditions corresponding to a sensed image to the database may be done. Upon the lapse of a predetermined time in step S505, the display ends in step S506.

By the above-described photographing processing of the image sensing apparatus, the coincidence with the distribution of the database can be confirmed for status data of an image displayed by the rec view immediately after photographing.

The present invention is also achieved when, for example, software program codes for realizing the functions of the above-described embodiments are supplied to an image sensing apparatus via a network such as the Internet, and the computer (or the CPU or MPU) of the image sensing apparatus reads out and executes the program codes stored in the storage medium.

In this case, the program codes read out from the storage medium realize the functions of the CPU in the above-described embodiments, and the storage medium which stores the program codes constitutes the present invention.

The storage medium for supplying the program codes includes a floppy® disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) or the like running on the computer performs part or all of actual processing on the basis of the instructions of the program codes.

Furthermore, the functions of the above-described embodiments are realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

When the present invention is applied to the storage medium, the storage medium stores program codes corresponding to the above-described flow charts. In short, modules indispensable to the image sensing apparatus of the present invention are stored in the storage medium.

As has been described above, the embodiments can eliminate cumbersomeness and improve the photographer's convenience by inputting settings to an image sensing apparatus by the user.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
a memory which stores a database maintaining statistical information, prepared in advance, representing the frequency of a plurality of past photographing operations in which each photographing operation involves an operation of at least an object distance and object brightness, the frequency being a function of a number of occurrences of an object distance and object brightness over the plurality of past photographing operations;
an acquisition device which acquires an object brightness value on the basis of image information sensed by an image sensing device; and
a control device which refers to the database stored in said memory to select an object distance having the highest photographing frequency among object distances corresponding to the object brightness value acquired by said acquisition device, and controls image sensing operation on the basis of the selected object distance.

2. The apparatus according to claim 1, wherein said control device sets a scanning range of a focus adjustment lens for determining an in-focus position by limiting the scanning range to a predetermined range including a selected object distance, and determines an in-focus position.

3. The apparatus according to claim 2, wherein when no in-focus position can be determined, said control device drives and controls the focus adjustment lens to a position corresponding to the selected object distance.

4. The apparatus according to claim 1, wherein when the acquired brightness value and an object distance corresponding to an in-focus position are not more than thresholds, said control device controls the image sensing operation to indoor image sensing operation.

5. The apparatus according to claim 4, wherein as the indoor image sensing operation, an emission amount of test emission of emitting light in advance in order to set an emission amount of an illumination device for illuminating an object is set smaller than an outdoor emission amount.

6. The apparatus according to claim 4, wherein as the indoor image sensing operation, an extraction range for extracting white image information from the image information sensed by the image sensing device in order to adjust white balance is made by said control device to differ from an outdoor extraction range.

7. The apparatus according to claim 1, wherein said control device slices the database by the object brightness value acquired by said acquisition device, and selects the object distance having the highest photographing frequency among the sliced cross section.

8. An image sensing method comprising:
acquiring an object brightness value on the basis of image information sensed by an image sensing device;
referring to a memory which stores a database maintaining statistical information, prepared in advance, representing the frequency of a plurality of past photographing operations in which each photographing operation involves an operation of at least an object distance and object brightness, the frequency being a function of a number of occurrences of an object distance and object brightness over the plurality of past photographing operations, and selecting an object distance having the highest photographing frequency among object distances corresponding to the object brightness value acquired in said acquiring step; and
controlling image sensing operation on the basis of the selected object distance.

9. The method according to claim 8, wherein as control of the image sensing operation, a scanning range of a focus adjustment lens for determining an in-focus position is set by limiting the scanning range to a predetermined range including a selected object distance, and an in-focus position is determined.

10. The method according to claim 9, wherein as control of the image sensing operation, when no in-focus position can be determined, the focus adjustment lens is driven and controlled to a position corresponding to the selected object distance.

11. The method according to claim 8, wherein as control of the image sensing operation, when the acquired brightness value and an object distance corresponding to an in-focus position are not more than thresholds, the image sensing operation is controlled to indoor image sensing operation.

12. The method according to claim 11, wherein as the indoor image sensing operation, an emission amount of test emission of emitting light in advance in order to set an emission amount of an illumination device for illuminating an object is set smaller than an outdoor emission amount.

13. The method according to claim 11, wherein as the indoor image sensing operation, an extraction range for extracting white image information from the image information sensed by the image sensing device in order to adjust white balance is made to differ from an outdoor extraction range.

14. The method according to claim 8, wherein in said control step, the database is sliced by the object brightness value acquired in said acquisition step, and the object distance having the highest photographing frequency among the sliced cross section is selected.

15. A computer readable storage medium which stores a program for realizing the image sensing method comprising:

acquiring an object brightness value on the basis of image information sensed by an image sensing device;

referring to a memory which stores a database maintaining statistical information, prepared in advance, representing the frequency of a plurality of past photographing operations in which each photographing operation involves an operation of at least an object distance and object brightness, the frequency being a function of a number of occurrences of an object distance and object brightness over the plurality of past photographing operations, and selecting an object distance having the highest photographing frequency among object distances corresponding to the object brightness value acquired in said acquiring step; and controlling image sensing operation on the basis of the selected object distance.

* * * * *